March 18, 1952 C. E. HUFFMAN 2,589,386

PICKUP DEVICE FOR COLOR TELEVISION

Filed Dec. 2, 1947

INVENTOR.
Charles E. Huffman
BY
Charles W. Mortimer
ATTY.

Patented Mar. 18, 1952 2,589,386

UNITED STATES PATENT OFFICE 2,589,386

PICKUP DEVICE FOR COLOR TELEVISION

Charles E. Huffman, Upper Montclair, N. J., assignor to Allen B. Dumont Laboratories, Inc., Passaic, N. J., a corporation of Delaware Application December 2, 1947, Serial No. 789,297

3 Claims. (Cl. 315—10)

In color television, methods using rotating color filters to provide sequential scanning of each successive interlaced field in a different one of the primary colors used, when using pickup tubes having a storage type of mosaic, present the problem of discharging the unscanned lines of the alternate field before illuminating the masaic with the image of the next succeeding color. This reduces the effective storage time and results in lowered signal output or decreased light efficiency. There are further problems introduced by the mechanical additions to an electronic system such as synchronization, space requirements, noise, and others.

This invention eliminates the use of rotating mechanical elements and increases the storage time or signal output over that obtained with rotating sequential filters by a factor approaching 6 as a limit.

The invention may be understood from the description in connection with the accompanying drawing in which.

The scanning beam of the pickup tube in each one of the embodiments of the invention shown in this application is caused to produce a control signal, which is used to confine the path of this beam to a predetermined course across the mosaic.

These control signals are generated in the same manner as described in connection with the electron tube in the application mentioned below.

A stationary, striated color filter (such as is illustrated and described in my application, Serial No. 638,800, filed January 3, 1946, which is now U. S. Patent No. 2,490,812 issued December 3, 1949) is interposed in the optical system so as to project the image to be scanned on the mosaic in such form that each picture line consists of parallel discrete narrower lines in which each of the primary colors is segregated.

By means of the control signal generated for each line, the scanning spot is confined to the same color portion of each alternate picture line during succeeding fields.

In double interlaced, three color scanning, each color line is thus scanned only every sixth field, instead of every second or alternate field as with rotating color filters.

Each separate color line is therefore allowed to store charge throughout the entire time between scans and does not need to have its charge erased to allow for exposure to a different color image after each field, which comprises only half the lines of a frame, has been scanned.

Figure 1:
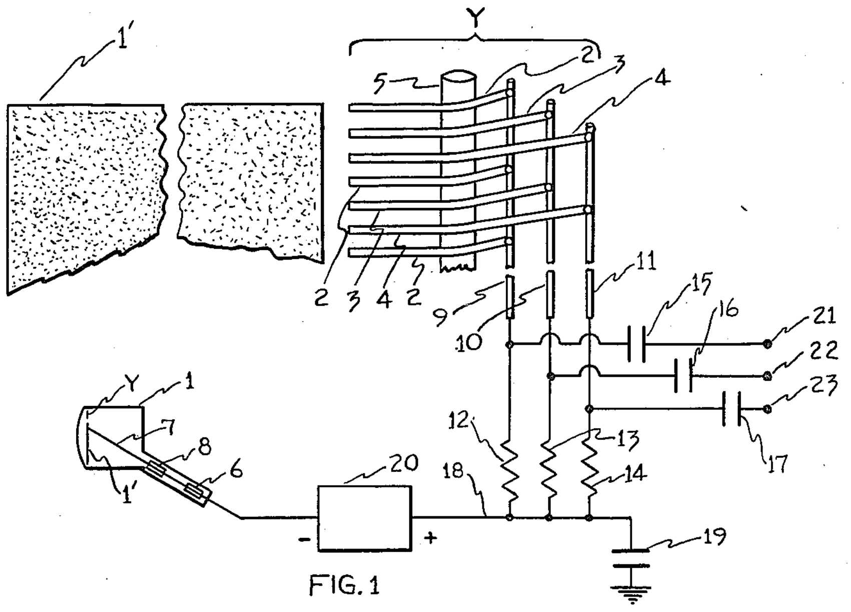
Fig. 1 is a partly diagrammatic view partly broken away showing an illustrative embodiment of the invention.
Figure 2:
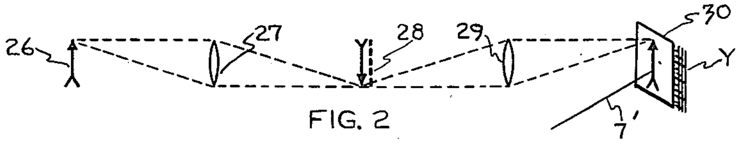
Fig. 2 is another partly diagrammatic view which is partly in perspective, of a different embodiment of the invention in which a filter is located in front of a mosaic and the scanning beam is on the same side.

Fig. 1 shows a structure Y on an enlarged scale, similar to that shown in Fig. 2 of my co-pending application, Serial No. 789,296, entitled "Control Signals for Sequential Color Television," filed of even date herewith. This structure is incorporated adjacent the mosaic in the envelope of the pickup tube 1. It is located with respect to the mosaic 1′ in such a manner that it occupies the same position in the tube as that shown in the above mentioned application.

The control conductors 2, 3 and 4, shown on an enlarged scale, are supported on an insulating rod 5 and mounted adjacent one edge of the mosaic 1′. Reference character 6 indicates an electron gun which produces an electron beam 7 that is deflected by deflecting means 8 in the known way. Light from a scene is caused to pass through a striated color filter (not shown) that is placed in front of the mosaic 1′ and so aligned that the control conductors described below are parallel to and form a prolongation of the color lines thus projected on the mosaic.

The groups of conductors 2, 3 and 4 making up the control structure Y are connected respectively to rods 9, 10 and 11 from which leads pass out of the tube for external connection to the ends of resistors 12, 13 and 14, and condensers 15, 16 and 17, respectively. The resistors 12, 13 and 14 have their other ends connected to lead 18 one end of which is coupled by condenser 19 to ground. The other end of lead 18 is connected to the positive terminal of a source 20 of variable potential to control the intensity of the beam. The negative end of this source 20 is connected to the cathode of the pickup tube 1.

Leads 21, 22 and 23 with condensers 15, 16 and 17 therein couple the rods 9, 10 and 11 to a device (such as is shown, for example, in my application, Serial No. 638,799, filed January 3, 1946, which is now U. S. Patent 2,530,431 issued November 21, 1950, entitled "Device for Utilizing Control Signals") which causes the beam to scan the color lines correctly.

Figure 4:
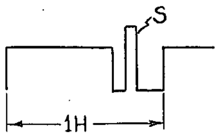
Fig. 4 is a diagram showing a preferred type of grid control signal which is suitable for use in operating one form of this invention.

In order to insure that a control signal of usable magnitude is generated it is sometimes desirable to provide a signal, during the negative blanking pulse that is normally supplied to the control grid of the electron gun 6 of tube 1, to cause a suitable amount of beam current while the beam is traversing the control conductors 2, 3 and 4. This amount of beam current may be in excess of the maximum that is employed while the beam is scanning the photosensitive area. Such a signal may be as indicated at S in Fig. 4.

In the diagrammatic embodiment of the invention shown in Fig. 2, which is for use with the type of pickup tube in which the mosaic is scanned on the same side as that upon which the image is projected, the scene 26 is focussed by the lens 27 onto the striated color filter 28. The image on this filter 28 is focussed by another lens 29 on to the mosaic 30. The resulting scene thus focussed on the mosaic 30 then consists of narrow bands of the three colors red, blue and green the intensity of which is proportional to the intensity of the color present in the same relative portions of the scene 26. Thus the signal produced as the beam 7' scans the mosaic 30, is, at any instant, proportional to the intensity of the color then being scanned. The control structure Y is placed adjacent the mosaic 30 as described above.

Figure 3:
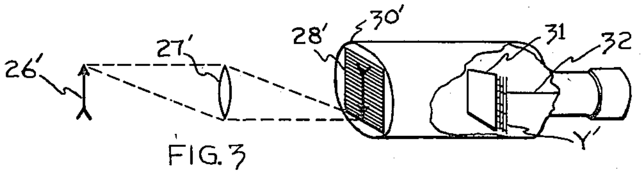
Fig. 3 is another view partly in perspective showing another embodiment of the invention in which a filter is located in front of a mosaic and the scanning beam is on the opposite side, such as the image orthicon.

In the somewhat diagrammatic embodiment of the invention shown in Fig. 3, which is for use with the type of pickup tube in which the mosaic is scanned on the opposite side from that upon which the image is projected, such as the image orthicon, for example, the scene 26' is focussed by the lens 27' on the photo-cathode surface 30' in front of which is mounted a striated color filter 28'. The image on the photo-cathode then consists of narrow bands of the three colors red, blue and green the intensity of which is proportional to the intensity of the color present in the same relative portions of the scene 26'. In the known way an electron image is produced on the front surface of the mosaic 31 which is scanned in the usual way at the rear by the beam 32. The control structure Y' is placed adjacent the mosaic 31 in a manner similar to that described above.

Since the beam 32 is operated at a fixed intensity in this type of tube, in general there will be sufficient beam current as the beam traverses the control area Y' to produce usable control signals. However, when the intensity of this beam is not sufficient a pulse of positive potential may be applied over lead 18 in the well known manner, and utilized to insure the generation of control signals of the desired magnitude.

What is claimed is:

1. An electron tube containing a photosensitive screen, a structure comprising a plurality of conducting elements positioned adjacent said screen, electrically insulated therefrom and substantially in a common plane therewith, and means to produce an electron beam and means to deflect and scan said beam successively over said screen and said structure, said structure comprising a plurality of groups of conductors having the conductors of each group connected to a lead which is common only to that group.

2. An electron tube containing a photosensitive screen, a structure comprising a plurality of conducting elements positioned adjacent said screen, electrically insulated therefrom and substantially in a common plane therewith, means to produce an electron beam and means to deflect and scan said beam successively over said screen and said structure, said structure comprising a plurality of groups of conductors having the conductors of each group connected to a lead which is common only to that group, a control device to provide correcting voltage for the scanning pattern of said beam, and an electrical connection between said leads and said control device.

3. The apparatus of claim 1 in which said conducting elements have a width approximately that of the diameter of said beam.

CHARLES E. HUFFMAN.

REFERENCES CITED

The following references are of record in the file of this patent:

UNITED STATES PATENTS

| Number | Name | Date |
|---|---|---|
| 1,976,400 | Ilberg | Oct. 9, 1934 |
| 2,296,908 | Crosby | Sept. 29, 1942 |
| 2,307,212 | Goldsmith | Jan. 5, 1943 |
| 2,415,059 | Zworykin | Jan. 28, 1947 |
| 2,446,249 | Schroeder | Aug. 3, 1948 |
| 2,498,705 | Parker | Feb. 28, 1950 |